Feb. 6, 1951     G. D. FORBES ET AL     2,540,720
TRANSMISSION LINE
Filed Aug. 1, 1945
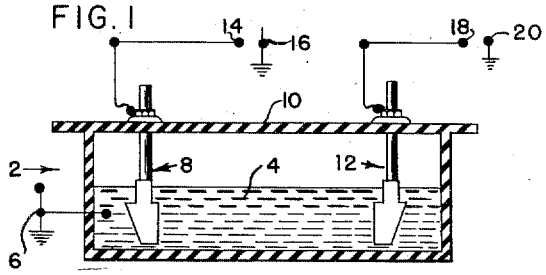
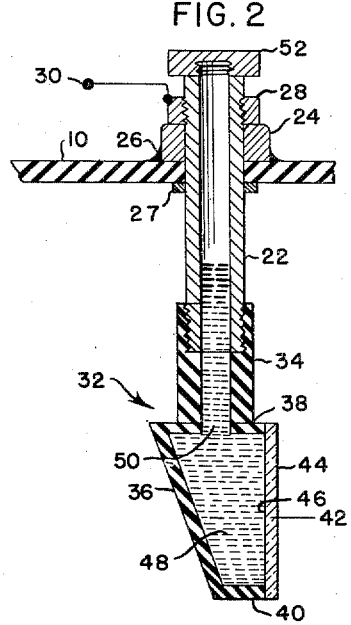
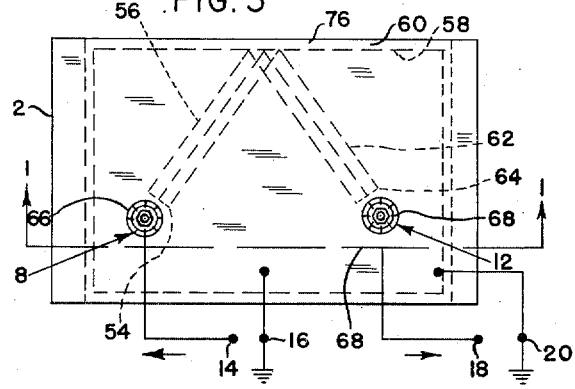
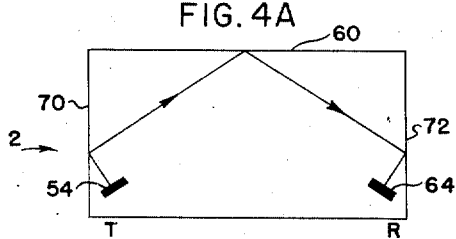
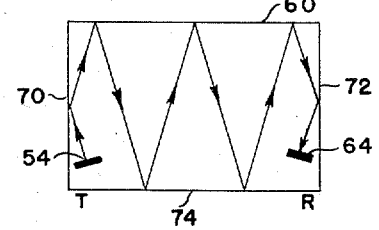
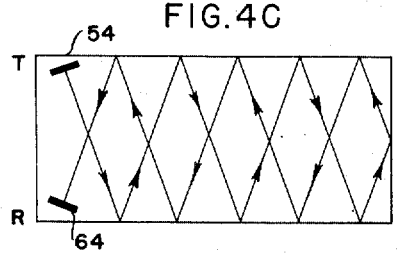
INVENTOR
GORDON DONALD FORBES
HERBERT SHAPIRO
BY
William D. Hall
ATTORNEY Patented Feb. 6, 1951

2,540,720

UNITED STATES PATENT OFFICE 2,540,720

TRANSMISSION LINE

Gordon Donald Forbes, Sudbury, and Herbert Shapiro, Cambridge, Mass., assignors, by mesne assignments, to the United States of America as represented by the Secretary of War Application August 1, 1945, Serial No. 608,309

6 Claims. (Cl. 178—44)

The present invention relates to a transmission means, and it relates more particularly to such a means which is adapted to delay signals of electrical energy for a predetermined period of time.

A transmission means having such a characteristic, is often called a delay line and is adapted to store electrical energy for a predetermined period. One use of such a device is in a radio object locating system of a character adapted to distinguish fixed objects from moving objects. A system of this general nature is disclosed in a copending application of Robert H. Dicke, Serial No. 590,052, filed April 24, 1945, now Patent No. 2,535,274, issued December 26, 1950.

In a system of this character, fixed (stationary) objects are manifested by video pulses having a constant amplitude, whereas moving objects are manifested by video pulses having a periodic variation in amplitude. It is evident that in the latter instance there is a difference in amplitude between successive video pulses, whereas there is no difference in amplitude between successive video pulses manifesting fixed objects. Thus, by comparing successive pulses, in order to determine the amplitude difference between them, and by providing an indicator in such a system which is responsive only to said difference, moving objects only may be indicated.

It is therefore evident that to compare a first signal with a second signal occurring a predetermined time later, the first signal must be delayed or stored for a period of time equal to the time interval between the two.

Prior delay lines consist in general of a container having a transmitting medium such as mercury, confined between two piezoelectric crystals. A signal to be delayed is impressed across one of the crystals (transmitting) causing it to mechanically vibrate, thereby producing ultrasonic oscillations which may be of the order of 10 to 30 megacycles. These ultrasonic oscillations are transferred, as a compressional wave, to the mercury and are propagated therethrough at a predetermined rate, finally impinging on the second crystal. The compressional wave stresses this second (or receiving) crystal in accordance with the well known piezoelectric phenomenon to induce an electrical charge thereon, thereby producing a signal similar to that applied to the first crystal. The delay incurred is equal to the time it takes for the compressional wave to travel from the first to the second crystal, and therefore, in order to delay a signal for an appreciable length of time, the distance between the two crystals must be relatively long. In addition, as the crystals are spaced a predetermined distance apart such a line is adapted to delay signals for a single predetermined period only. For these and other reasons, prior delay lines have been somewhat unsatisfactory for certain applications.

It is therefore, an object of the present invention to provide a delay line which is adapted to provide an adjustable period of delay for signals of electrical energy.

It is another object of the present invention to provide a novel, compact delay line having relatively small dimensions which may provide variable periods of delay.

The present invention will be more fully understood from the following description taken in connection with the accompanying drawings wherein:

Fig. 1 shows a sectional elevation view of one embodiment of the present invention taken along line 1—1 of Fig. 3;

Fig. 2 is a detailed sectional view of one of the crystal assemblies shown in Fig. 1;

Fig. 3 shows a top view of one embodiment of the present invention; and

Fig. 4 shows a schematic diagram illustrating certain aspects of the invention.

Referring now to Fig. 1, a tank or container 2 having mutually perpendicular walls is partially filled with mercury 4 which is maintained at ground potential by grounded tank terminal 6. A transmitting crystal assembly 8, or transducer the details of which are more clearly shown in Fig. 2, is rotatably mounted on cover 10 of tank 2. A receiving crystal assembly 12, or transducer identical in all respects to transmitting crystal assembly 8, is similarly mounted at a second point on cover 10, the mountings being electrically insulated from each other. It will be clearly seen hereinafter that the relative location of the transmitting and receiving crystal assemblies on top 10 is not critical. The signal to be delayed is applied between input terminal 14 (connected to crystal assembly 8) and associated grounded terminal 16, and the resultant delayed signal is developed between output terminal 18 (connected to crystal assembly 12) and associated grounded terminal 20.

The details of transmitting crystal assembly 8 and receiving crystal assembly 12 (the two assemblies being identical) and one means of mounting the crystal assemblies to cover 10 of tank 2, are shown in Fig. 2. A hole adapted to accommodate tubular shaft 22 extends through tank cover 10, and a collar 24 similarly adapted to accommodate shaft 22 is fastened to the top of said cover. Collar 24 is positioned so that its axis is coincident with the axis of the hole, and it is mounted on cover 10 in any suitable manner. One method is to affix it to tank cover 10 by means of a cement bond 26, as shown.

Tubular shaft 22, which is threaded at both ends, extends through collar 24 and the hole formed in cover 10 so that a substantial portion of the upper threaded end of shaft 22 projects above the collar. A flange 27 mounted on shaft 22 bears against top 10 to position the shaft in a proper manner. A nut 28 is associated with the upper threaded end of shaft 22 to hold said shaft firmly against collar 24. Terminal 30 (corresponding to terminals 14 and 18 of Fig. 1) is electrically connected to shaft 22 where said connection may be made through nut 28.

A crystal holder 32 which is made of an electrical insulating material such as Bakelite and which consists of a threaded sleeve 34, a tapered back wall 36, a top 38, and a bottom 40, is associated with the lower threaded end of tubular shaft 22. The holder has side walls (not shown) which cooperate to define a cavity 48 in said holder. Top 38 and bottom 40 are plane surfaces which in the present embodiment are substantially parallel. Back wall 36 which connects top 38 and bottom 40 is likewise a plane surface, but it is angularly disposed to the axis of shaft 22. Piezo electric crystal 42 having an outer oscillating face 44 and an inner oscillating face 46 is cemented, or otherwise suitably fastened, to top 38, bottom 40 and the side walls so that the oscillating faces of crystal 42 are substantially parallel to the longitudinal axis of shaft 22. A hole 50 extends through top 38 to provide a communication between cavity 48, and the hollow portions of sleeve 34 and shaft 22.

Mercury, introduced through the upper end of tubular shaft 22, completely fills cavity 48, the sleeve 34, and a portion of shaft 22. A cap 52 or other suitable closure may be provided for the upper end of shaft 22 to exclude foreign matter from the mercury. It is apparent that the metallic shaft and the mercury contiguous thereto provide an electrical connection between terminal 30 and oscillating face 46 of crystal 42. It is also evident that the entire crystal assembly may be readily rotated. This is accomplished by loosening nut 28, rotating shaft 22 to any desired position and again tightening nut 28. In order to prevent a short circuit between outer face 44 and inner face 46 of crystal 42, the level of the mercury 4 in tank 2 (Fig. 1) must not rise above insulating sleeve 34 and thereby come into contact with electrically conducting tubular shaft 22.

Referring now to Fig. 3 which shows a top view of the embodiment shown in Fig. 1 and where like reference numerals designate like parts, transmitting crystal assembly 8 and receiving crystal assembly 12 are located at two points as shown. As the outer face (same as outer face 44 Fig. 2) of transmitting crystal 54 is in contact with the mercury in the tank, said face is maintained at ground potential. The inner face (same as face 46 Fig. 2) in said crystal is electrically insulated from the mercury in the tank and is electrically connected to terminal 14. The signal to be delayed is impressed across transmitting crystal 54 by applying it to input terminals 14 and 16. Transmitting crystal 54 vibrates mechanically and produces ultrasonic oscillations which are transferred as a compressional wave to the mercury 4 contained in tank 2.

The compressional wave is highly directional and has a frequency of oscillation substantially equal to the carrier frequency of the applied signal. It is propagated through the mercury in a direction normal to the oscillating face of the crystal along path 56, as shown in the drawing, until it strikes the inner surface 58 of tank wall 60. The compressional wave is reflected by wall 60 and travels along path 62 until it strikes crystal 64 which forms a part of receiving crystal assembly 12. The amount of delay provided by the system is proportional to the distance traveled by the compressional wave from crystal 54 along path 56 and reflected path 62 to crystal 64.

As both the transmitting and receiving crystal assemblies are rotatably mounted, it is apparent that the compressional wave propagated by the transmitting crystal can be made to impinge on wall 60 at any desired angle. Similarly, receiving crystal assembly 12 may be rotated so that the wave reflected from wall 60 strikes receiving crystal 64 so as to mechanically stress said crystal and induce thereon a charge which appears across output terminals 18 and 20.

In order to easily predetermine the angular position of the transmitting crystal relative to the tank walls a calibrated dial 66 may be associated with the rotatable shaft of transmitting crystal assembly 8. A similar calibrated dial 68 likewise may be provided for receiving crystal assembly 12.

One of the stated objects of the present invention is to provide a delay line adapted to have variable delay periods. The means of accomplishing this is readily apparent by reference to Fig. 4 which shows a schematic diagram of the paths a compressional wave may take in traveling from the transmitting crystal assembly to the receiving crystal assembly. The explanation of operation is merely one of geometry and is readily apparent from the figure.

Fig. 4a shows the transmitting crystal assembly rotated so that the compressional wave generated by transmitting crystal 54 strikes side wall 70 of tank 2 where it is reflected to side wall 60 where it is in turn reflected to side wall 72 and thence, to receiving crystal 64.

Fig. 4b shows an arrangement whereby a still longer delay may be obtained, and wherein the compressional wave generated by transmitting crystal 54 reflects from side wall 70 and then multiply reflects between walls 60 and 74 to be finally reflected to wall 72 and thence to receiving crystal 64.

Fig. 4c shows still another mode of operation where transmitting crystal 54 and receiving crystal 64 are positioned at one end of tank 2. After multiple reflections between the various walls of the tank, the compressional wave finally reaches receiving crystal 64. The minimum period of delay is obtained by positioning the transmitting crystal assembly and the receiving crystal assembly so that the outer faces of the respective crystals are parallel. In such an instance the compressional wave travels directly to the receiving crystal without reflection from the tank walls.

In view of the foregoing description, it is apparent that by rotating transmitting crystal 54 and receiving crystal 64, to certain predetermined positions, the amount of delay may be varied at will.

The walls, 60, 70, 72 and 74 of tank 2 may be made of practically any insulating material. There are however certain limitations regarding the angle at which the compressional wave impinges against the reflecting wall of the tank. The problem, simply stated, is to have the compressional wave strike the wall at such an angle that practically all of the energy will be reflected and practically none refracted. This means that the angle at which the compressional wave strikes the wall must be greater than the critical angle (angle above which the energy will be reflected and below which the energy will be refracted) of the material. For example, if the walls are made of glass, the angle of incidence, $\alpha$, must be greater than 23°.

If the side walls are made of glass and if angle of incidence $\alpha$ is less than the critical angle (approximately 23° for glass, when in contact with mercury), the compressional wave is not totally reflected by the inner surface 58 of glass wall 60 but instead is in part refracted into the glass and finally reflected by the outer surface 76 of wall 60. In traveling through the glass, the energy of the compressional wall is attenuated and, hence, a smaller signal is developed across output terminals 18 and 20 than would be the case if the wave was totally reflected by surface 58. In the instance of many multiple reflections, the original signal is attenuated a multiple number of times and as a result a small signal is developed at the receiving crystal. Thus, for best operation, the compressional wave should strike the walls of the tank at an angle greater than the critical angle.

If the walls are made of "Bakelite" or certain other materials, excellent results may be obtained without particular consideration as to the critical angle. The reason for this may best be explained from the following description of acoustic impedance.

Acoustic impedance may be defined as the product of the velocity (V) of sound through a medium, and the density ($\rho$) of the medium; i. e., acoustic $Z = \rho V$. It is well known that in electrical circuits the maximum amount of electrical energy is transferred from one circuit to another circuit when the impedances of the two circuits are equal. Similarly, when the acoustic impedance of the piezoelectric crystal is equal to the acoustic impedance of the transmitting medium (mercury in the embodiment discussed), the oscillatory energy of the crystal is more readily transferred to the transmitting medium.

Consider a piezoelectric crystal which is adapted to oscillate at a predetermined frequency and which is immersed in mercury (which has an acoustic impedance of the same order as that of a piezoelectric crystal). Further assume that a pulse of electrical energy having a carrier frequency equal to the predetermined operating frequency of the crystal is applied thereto. The crystal then oscillates, and because of the good impedance match between the piezoelectric crystal and the mercury, the oscillatory energy of the crystal is readily transferred to the mercury as a compressional wave. Upon removal of the pulse, the crystal oscillations are quickly damped and a pulsed compressional wave travels through the mercury to the receiving crystal. In such an instance, the "Q" of the crystal is said to be low and the character of the pulse developed at the receiving crystal is substantially the same as the original pulse applied to the transmitting crystal.

If, however, the impedance of the transmitting medium is not substantially equal to the acoustic impedance of the crystal, the crystal does not readily transfer its energy to the medium. In such an instance, the crystal is said to have a high "Q," and even after removal of the pulse, the crystal continues to oscillate. The character of the delayed pulse is thus somewhat different than the character of the original pulse applied to the transmitting crystal.

The acoustic impedance of mercury is of the same order as the acoustic impedance of glass, and therefore, if the walls of the tank are made of glass the compressional wave upon striking the walls at an angle less than the critical angle transfers an appreciable amount of its energy to the glass, and, hence, is attenuated as heretofore stated. As the acoustic impedance of "Bakelite" is far different than the acoustic impedance of mercury, it forms an excellent material for the tank walls. The compressional wave on striking the "Bakelite" does not transfer much of its energy to the wall regardless of the angle of incidence and hence is almost totally reflected. Furthermore, by making the "Bakelite" walls fairly thick (approximately one-half inch) the energy refracted into the walls is attenuated therein to such a degree that very little emerges therefrom. It is therefore evident that as, in the case of "Bakelite," the critical angle is not of paramount importance, the angle of incidence may be very small and hence it is possible to get many multiple reflections from the tank walls with very little difficulty. One outstanding advantage of this is that in a tank of a predetermined size, long delays may be more easily obtained in a tank having "Bakelite" walls than in one having glass walls.

In view of the foregoing discussion, it is apparent that the walls of the tank need not be made of glass or "Bakelite" but that any material may be used. It is also evident that in order to more easily obtain long delays, it is preferable to have an appreciable mismatch between the impedance of the tank walls and the transmitting medium, which in the present embodiment is mercury. It is similarly evident that transmitting medium need not be mercury but for best signal fidelity it is preferable that the medium have an acoustic impedance substantially equal to the acoustic impedance of a piezoelectric crystal. It is further understood that if the transmitting medium is not electrically conductive a separate electrical connection to the outer face of each crystal replaces tank terminal 6 (Fig. 1).

Reference again is made to Fig. 2 and more particularly to crystal holder 32 shown therein. Upon application of a signal of electrical energy across crystal 42 (as explained in connection with Fig. 3) crystal faces 44 and 46 oscillate. As outer crystal face 44 is in contact with the mercury in the tank, said crystal face generates the previously discussed compressional wave. Crystal face 46 also oscillates however and unless some means is provided for damping the oscillations of crystal face 46, a distorted signal is received at the receiving crystal.

One means of preventing this distortion is to fill cavity 48 with mercury. The oscillatory energy of the inner face of the crystal is transferred to the mercury in the form of a compressional wave similar to that set up in the tank. In order to prevent this energy from being reflected in a manner to cause distortion of the signal developed at the receiving crystal, back wall 36 is angularly disposed with the crystal face. The angular disposition is such that energy reflected from back wall 36 is again reflected by inner crystal face 46, and after a number of such reflections, the compressional wave escapes from the cavity (through the crystal) in considerably attenuated form and hence does not seriously interfere with the signal generated by crystal face 44.

Although the figure shows a tank having four walls, it is to be understood that the invention is not limited to this type of container but that other containers having a plurality of reflecting walls may be used. It is also further understood that the mercury in the tank need not be maintained at ground potential but may be maintained at any desired reference voltage by connecting presently grounded terminal 6 (Fig. 1) to a suitable source of potential. In such an instance terminals 16 and 20 (Fig. 1) are likewise connected to the same source of potential.

It is to be understood that the transmitting medium need not be a liquid but instead may be a solid material. In view of the foregoing description it is evident that the major purposes of the tank are twofold: first it holds the transmitting medium, and secondly it forms a reflecting surface for the compressional wave energy. In the instance where a solid transmitting medium is used, the medium is self contained and no walls are required for that purpose. Likewise as there is an appreciable acoustic impedance mismatch between the transmitting medium and the air (surrounding the medium) the compressional wave energy does not leave the transmitting medium but instead is multiply reflected. Thus it is evident that a walled tank or container is not necessary if a solid transmitting medium is used.

It will be further understood that various changes and modifications may be made in the precise details of the invention described above, and that the invention is to be taken as herein defined in the following claims.

We claim:

1. A transmission means adapted to delay signals of electrical energy including a tank having a bottom, a cover and side walls, a first crystal assembly associated with said cover, a second and similar crystal assembly associated with said cover at a point remote from said first assembly, said points of association being electrically insulated from each other, each crystal assembly including a hollow metal shaft threaded at each end and extending through said cover, the upper end of said shaft constituting an electrical terminal, means for rotatably associating said shaft with said cover, the lower end of said shaft protruding into said tank, a crystal holder associated with the lower end of said shaft and made of insulating material, said holder having a cavity therein, piezoelectric crystal associated with said holder and forming an end closure for said cavity, said cavity having a wall opposite to said crystal inclined at an angle with the plane of the crystal, said cavity communicating with said shaft, mercury in said cavity forming an electrical connection between the lower end of said shaft and the inner face of said crystal, mercury in said tank insulated from said shaft, the level of said mercury being sufficient to cover the outer face of said crystal, and a tank terminal electrically connected to the mercury in said tank, the input to said transmission means being applied across the terminal of one crystal assembly and the tank terminal, the output being taken from the terminal of the other crystal assembly and the tank terminal.

2. A transmission means adapted to delay signals of electrical energy including a tank having a bottom, a cover and side walls, a first crystal assembly associated with said cover, a second and similar crystal assembly associated with said cover at a point remote from said first assembly, each crystal assembly including a shaft threaded at each end and extending through said cover, means for rotatably associating said shaft with said cover, the lower end of said shaft protruding into said tank, a crystal holder associated with the lower end of said shaft and made of insulating material, said holder having a cavity therein, a piezoelectric crystal associated with said holder and forming an end closure for said cavity, a medium in said cavity, said medium having an acoustic impedance substantially equal to the acoustic impedance of the piezoelectric crystal, a terminal electrically connected to the inner face of said crystal, a transmitting medium in said tank, the acoustic impedance of said transmitting medium being substantially equal to the acoustic impedance of said crystal, the level of said transmitting medium being sufficient to cover the outer face of said crystal, said side walls of said tank being made of a material whose acoustic impedance is appreciably different from the acoustic impedance of the transmitting medium whereby substantially all of the energy impinging on said walls is reflected, a tank terminal electrically connected to the outer face of each crystal, an input signal being applied to the terminal of one crystal assembly and the tank terminal, the output being taken from the terminal of the other crystal assembly and the tank terminal.

3. A transmission means adapted to delay signals of electrical energy including a tank having a bottom, a cover and side walls, a transmitting crystal assembly associated with said cover, a receiving crystal assembly similar to said transmitting crystal assembly associated with said cover at a point remote from said transmitting crystal assembly, said points of association being electrically insulated from each other, each crystal assembly including a shaft extending through said cover, means for rotatably associating said shaft with said cover, the lower end of said shaft protruding into said tank, a crystal holder associated with the lower end of said shaft, a piezoelectric crystal associated with said crystal holder, means in said crystal holder for suppressing the oscillatory energy of the inner face of said crystal, a terminal electrically connected to said inner face, a transmitting medium in said tank, the acoustic impedance of said transmitting medium being substantially equal to the acoustic impedance of said crystal, the level of said transmitting medium being sufficient to cover the outer face of said crystal, said side walls of said tank being made of a material whose acoustic impedance is appreciably different from the acoustic impedance of the transmitting medium whereby substantially all of the energy impinging on said walls is reflected, means for rotating said receiving crystal assembly so that the compressional wave energy in said transmitting medium stresses the piezoelectric crystal associated with said receiving crystal assembly to induce a charge on said crystal, a terminal electrically connected to the oscillating face of each crystal contacting the transmitting medium, an input signal being applied to the terminal of one crystal assembly and the tank terminal, the output terminal being taken from the other crystal assembly of the tank terminal.

4. A transmission means adapted to delay signals of electrical energy including a tank, a transmitting medium in said tank having reflecting boundaries, transmitting and receiving piezoelectric crystals immersed in said medium, means for impressing an input signal to be delayed across said transmitting crystal to produce ultrasonic wave energy in said medium, means for rotatably mounting said crystals to include a variable number of reflections from said boundaries before reaching said receiving crystal by varying the direction of travel of the ultrasonic wave energy in the medium, whereby said receiving crystal may be stressed by the ultrasonic wave energy to induce an output signal thereon, said output signal being delayed with respect to the input signal by an amount proportional to the length of the path traveled by the ultrasonic wave energy in the medium.

5. A transmission means adapted to delay signals of electrical energy including a transmitting medium, ultrasonic energy reflecting surfaces, directive transducers immersed in said medium, means for impressing an input signal to be delayed across one said transducer to produce directive ultrasonic wave energy in said medium between said transducers in a path including reflections from said reflecting surfaces and for deriving an output signal from another said transducer, and means for changing the direction of propagation of said ultrasonic energy relative to said surfaces to vary the path length of said wave by changing the reflection paths of said energy.

6. A transmission means adapted to delay signals of electrical energy including a transmitting medium, ultrasonic energy reflecting surfaces, directive transducers coupled to said medium, means for impressing an input signal to be delayed across one said transducer to produce directive ultrasonic wave energy in said medium between said transducers in a path including reflections from said reflecting surfaces and for deriving an output signal from another said transducer, and means for varying the number of reflections of said energy in said path between said transducers, in order to vary the path length of said wave.

GORDON DONALD FORBES.
HERBERT SHAPIRO.

REFERENCES CITED

The following references are of record in the file of this patent:

UNITED STATES PATENTS

| Number | Name | Date |
|---|---|---|
| 2,263,902 | Percival | Nov. 25, 1941 |
| 2,401,094 | Nicholson, Jr. | May 28, 1946 |
| 2,427,348 | Bond et al. | Sept. 16, 1947 |